Feb. 3, 1925.
W. J. STEWART
SPRING FINGER BAR FOR POULTRY COOLING RACKS
Filed Nov. 15, 1922
1,525,010
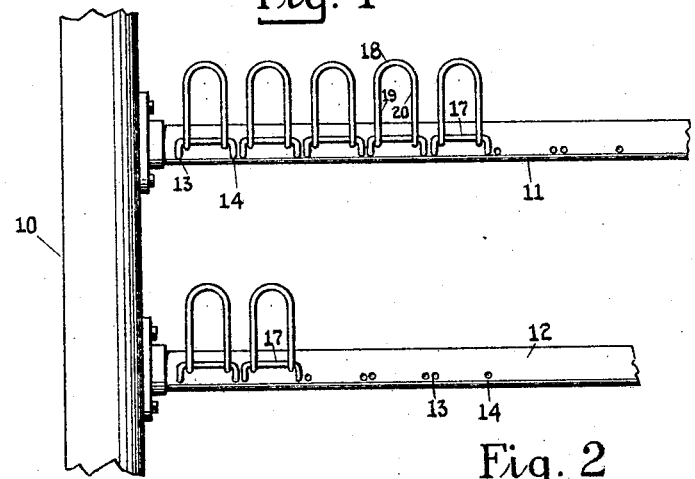
Fig. 1
Fig. 2
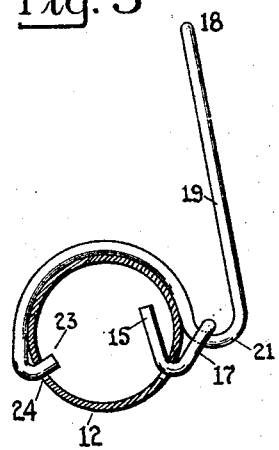
Fig. 3
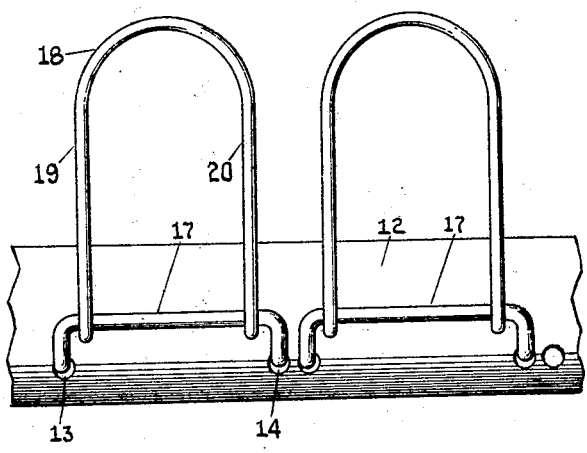
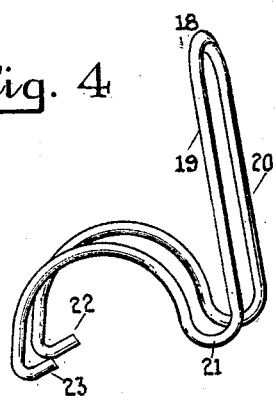
Fig. 4
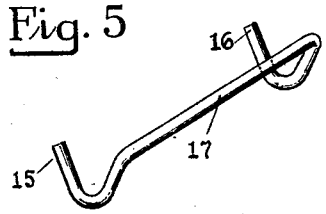
Fig. 5
William J. Stewart,
Inventor
By his Attorneys, Dodson & Roe Patented Feb. 3, 1925.

1,525,010

UNITED STATES PATENT OFFICE.

WILLIAM J. STEWART, OF CLINTON, IOWA.

SPRING-FINGER BAR FOR POULTRY-COOLING RACKS.

Application filed November 15, 1922. Serial No. 601,035.

*To all whom it may concern:*

Be it known that I, WILLIAM J. STEWART, a citizen of the United States, residing in the city of Clinton, county of Clinton, and State of Iowa, have invented a certain new and useful Improvement in Spring-Finger Bars for Poultry-Cooling Racks, of which the following is a specification.

My invention relates to that class of poultry cooling racks such as are described in my co-pending application Serial No. 548,180 and has for its object to provide a finger in which the expense both of labor and manufacture and the material employed will be greatly lessened and to provide a finger which will be easily and quickly detached when desired.

My means of accomplishing the foregoing may be more readily understood by having reference to the accompanying drawings which are hereunto annexed and are a part of the specification, in which—

Fig. 1 is a fragmentary detail view of a portion of my cooling rack having my improved fingers thereon.

Fig. 2 is an enlarged detail view;

Fig. 3 is an enlarged detail view taken from the end of the device shown in Fig. 2.

Fig. 4 is an enlarged detail view of the fingers.

Fig. 5 is an enlarged detail view of the locking device for locking the fingers in position.

Similar reference numerals refer to similar parts throughout the entire description.

As shown in the drawings, the poultry cooling rack is provided with an upright member 10 which is provided with laterally extending or cross members 11 and 12. As shown, it is obvious that these can be in any desired number.

These cross members are preferably formed of tubing and are provided with a plurality of holes 13 and 14 in which are mounted the ends 15 and 16 of the lock 17. The ends 15 and 16 projecting inwardly through the tube 12 as clearly seen in Fig. 3.

The finger comprises a U-shaped portion 18 which is provided with two side members 19 and 20. The side members 19 and 20 are bent upon themselves as at 21. The arms are then bent in a reversed curve of the same diameter as the tube 12 and have inwardly extending hooks or prongs 22 and 23 which are adapted to enter openings 24 formed in the wall of the tube 12.

The device is assembled by mounting the ends 15 and 16 of the locking member 17 in the openings 13 and 14 and then inserting the U-shaped member 18 intermediate the outer surface of the tube 12 and the bar which forms a part of the locking device. The prongs 22 and 23 are then sprung over the tube 12 until they reach openings 24 when they will snap into position and hold the finger securely in position, it being apparent that the greater pressure exercised upon the U-shaped member, the tighter will be the engagement of the curve and prongs with the tube.

It will be obvious to persons skilled in the art that by inserting a screw driver intermediate the tube 12 and the ends adjacent the prongs 22 and 23, that they can be drawn from the holes 24 and the entire finger can be easily and quickly removed from the tube 12.

It will be apparent to persons skilled in the art that in this manner, I produce a finger which is interchangeable and which if broken can be replaced without having to dissemble the cooling rack to which the fingers are secured.

Having described my invention what I regard as new and desire to secure by Letters Patent is:

1. A spring finger for poultry racks comprising the combination with a tube of a U-shaped member formed of resilient metal, and formed into a reversed curve of more than 180 degrees and terminating in prongs which are adapted to enter holes formed in said tube, locking means mounted on said tube which hold the curve against the tube.

2. A spring finger for poultry racks comprising the combination with a tube of a U-shaped member formed of resilient material, the side members being bent to conform to the periphery of the tube for more than 180 degrees, the ends of said members being bent at substantially right angles and mounted in holes formed in said tube, locking means mounted on said tube which holds the side members against the tube.

3. A spring finger for poultry racks comprising the combination with a tube of a U-shaped member formed of resilient material, the side members being bent to conform to the periphery of the tube for more than 180 degrees, the ends of said members being bent at substantially right angles and mounted in holes formed in said tube, a lock for said finger, comprising a bar which extends across both of the said arms, the ends of said bar being bent at right angles adjacent the side members and then bent upon themselves forming an acute angle mounted in holes formed in said tube so as to form a chord of the circle formed by the tube.

4. A spring finger for poultry racks comprising the combination with a tube of a U-shaped member formed of resilient material, the side members being bent to conform to the periphery of the tube for more than 180 degrees, the ends of said members being bent at substantially right angles and mounted in holes formed in said tube, locking means detachably secured to the tube which engages the members of said finger adjacent the first named bend.

5. A spring finger for poultry racks comprising the combination with a tube of a U-shaped member formed of resilient material, and formed into a reversed curve of more than 180 degrees and terminating in prongs which are adapted to enter holes formed in said tube, detachable locking means mounted on said tube which hold the curve against the tube.

In testimony whereof, I have signed the foregoing specification.

WILLIAM J. STEWART.